Patented Nov. 16, 1926.

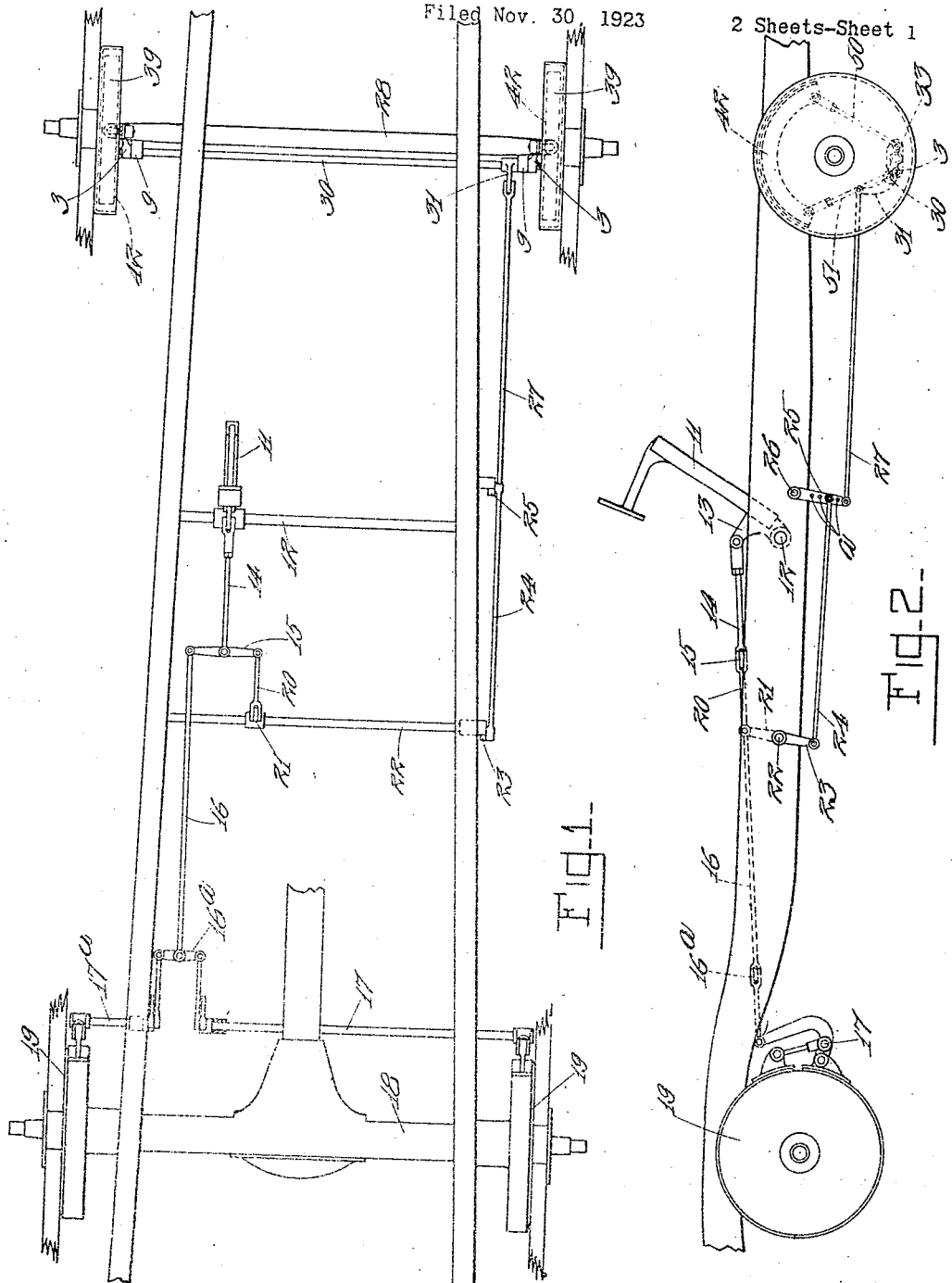

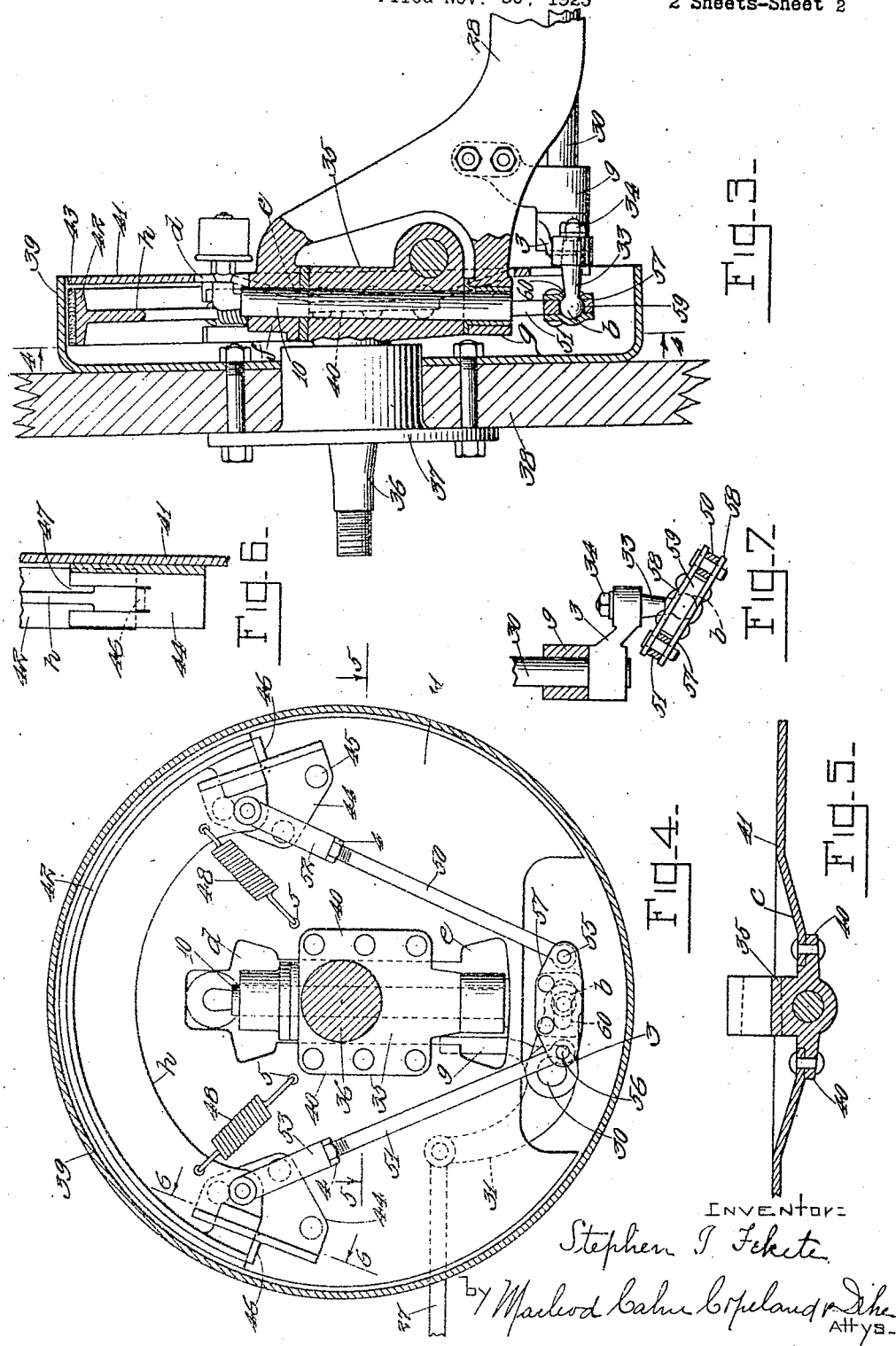

UNITED STATES PATENT OFFICE.

STEPHEN I. FEKETE, OF DETROIT, MICHIGAN, ASSIGNOR TO HUDSON MOTOR CAR COMPANY, OF DETROIT, MICHIGAN, A CORPORATION OF MICHIGAN.

VEHICLE BRAKE.

Application filed November 30, 1923. Serial No. 677,666.

The present invention has for its general object a new and improved brake mechanism by which braking effect may be applied simultaneously to all four wheels of an automobile. The particular object of the invention is to provide a simple, cheap, effective, and safe construction capable of application to vehicles having only rear wheel brakes without important structural changes in the vehicles, said construction including a novel form of brake for the front or steering wheels, together with improved operating mechanism therefor of such a character as not to interfere with or be affected by the steering of the vehicle, and means for connecting said operating mechanism with the devices for applying the rear brakes in such a manner as to produce the proper braking effect upon the several wheels.

The mechanism embodying the invention provides a simple and effective brake which will not lock or jam and thus prevent the front wheels from turning, cannot get out of adjustment, and yet has sufficient effectiveness to add materially to the controllability of the car.

The invention will be fully understood from the following description when taken in connection with the accompanying drawings, and the novel features will be pointed out and clearly defined in the claims at the close of this specification.

In the drawings:

Fig. 1 is a plan view of the chassis of an automobile to which are applied brakes embodying the invention.

Fig. 2 is a side elevation of the parts shown in Fig. 1.

Fig. 3 is a detail of one end of the front axle, showing in section portions of the brake, front wheel and operating mechanism.

Fig. 4 is a section on the line 4—4, Fig. 3.
Fig. 5 is a section of the line 5—5, Fig. 4.
Fig. 6 is a section on the line 6—6, Fig. 4.
Fig. 7 is a detail of the connection between the rock shaft and the socket member.

Referring particularly to the drawings, at 11 is shown an ordinary foot pedal pivoted at 12 having an arm 13 for connection to a link 14. The link 14 is connected at its rear end with an equalizer 15 one end of which is connected by a link 16 and equalizer 16ª to alined cross shafts 17 and 17ª located just in front of the rear axle 18. The cross shafts 17 and 17ª operate brakes on the rear wheels, the drums being shown at 19. In the drawings, contracting brakes of ordinary construction are shown, but brakes of any type may be employed.

The other end of the equalizer 15 is connected by a link 20 to one arm 21 of a rock shaft 22, the opposite arm 23 being connected by a link 24 to an idle lever 25. This idle lever 25 is pivoted at 26 to the frame of the chassis and has connected thereto a link 27 extending forward to the front axle 28 of the vehicle. The idle lever 25 is provided with additional holes $a$ so that the points of connection of the links 24 and 27 with the idle lever may be changed to vary the relative leverage through which the power is exerted on the rear and front brakes, respectively.

Journalled in brackets 9 secured to the rear of the front axle 28 is a rock shaft 30. This rock shaft has an upwardly extending arm 31 to which the forward end of the link 27 is connected, and at each end a forwardly extending arm 3. Each of these arms 3 is provided with a member 33 secured in place by a nut 34 and terminating in a ball-shaped head $b$. The centre of each ball-shaped head $b$ is a line with the pivotal axis of the corresponding steering knuckle, and said head forms the connection between the parts which are secured to the front axle and the parts which are secured to the steering knuckle and are movable with it.

In the drawings, the steering knuckle is designated 35, the stub axle being shown at 36, the wheel hub at 37, and the spokes at 38. The pintle pivotally connecting the knuckle 35 with the fork members $f$ and $g$ of the front axle 28 is shown at 10. Secured to the hub and spokes is a brake drum 39 the inner periphery of which forms the friction surface of the brake. Secured to flanges 40 on the steering knuckle is a plate 41 which is dished, as shown at $c$, and cut away, as shown at $d$ and $e$, to allow for movement thereof relative to the fork members $f$ and $g$ of the front axle. This plate 41 serves to enclose the brake mechanism, preventing dust, mud and water from entering the interior of the brake drum in any considerable quantities. It also, being fixed to the steering knuckle, forms a support for the non-rotating parts of the mechanism.

At 42 is shown a brake shoe contacting with the drum 39 for about 120° and provided with a brake lining 43 of suitable material. The shoe is provided with a flange or rib $h$. Secured to the plate 41, at each end of the shoe 42, is a torque stop 44 which serves not only to resist the torque imposed by the action of the brake, but also to support and guide the brake shoe. These stops are riveted, as shown at 45, to the plate 41 and have slots 47 terminating in inturned ears 46. The ears form abutments for the ends of the brake shoe 42, and the slots receive the ends of the flanges $h$ of said shoe and position the latter laterally as well as longitudinally. The torque stops 44 also form rests for the brake shoe when the brake is unengaged. At 48, 48, are shown springs connected at their upper ends to the rib $h$ of the brake shoe 42, while their lower ends are hooked through holes 5 in the plate 41. These springs serve to hold the shoe away from the drum and keep it seated on the torque stops when not in use.

The brake shoe 42 is moved upward into contact with the brake drum by two thrust rods 50 and 51 located on opposite sides respectively of the steering knuckle and secured at their upper ends by forks 52 and 53 to the flange $h$ on the shoe. The forks 52 and 53 are preferably drilled and tapped to receive the ends of the thrust rods and are locked in place by lock nuts 4. This construction furnishes a convenient means for adjusting the brakes, it only being necessary to lengthen or shorten the thrust rods the required amount by turning them in the forks.

The lower ends of the thrust rods 50 and 51 are pivotally connected respectively at opposite sides of the pivotal axis of the steering knuckle, as shown at 55 and 56, to an equalizing socket member 57. This equalizing socket member (see Fig. 7) is conveniently made from two side bars 58, between which the lower ends of the thrust rods 50 and 51 are received, and a block 59 having a central circular opening for the reception of the ball $b$ of the member 33. In order to facilitate the assembling of the parts, one of the side bars 58 is formed with a keyhole slot 60 through which the ball $b$ is inserted.

The operation of the brakes embodying the invention is as follows:—When the foot pedal 11 is depressed, it pulls the equalizer 15 forward, thus actuating both sets of brakes simultaneously but with a relative pressure depending upon the arrangement and proportions of the parts, and particularly the connection of the links 24 and 27 with the idle lever 25. The forward movement of the equalizer 15 swings the rock shaft 22 about its axis and pulls back the idle lever 25 which, in turn, pulls back the link 27 and swings the rock shaft 30. The movement of the rock shaft on its axis raises the ball-shaped heads $b$ of the members 33, and these, in turn, lift up the equalizing socket members 57. Each equalizing socket member, in turn, pushes up the thrust rods 50 and 51, lifting the shoe and pressing it against the inside of the brake drum. The equalizing socket member causes the brake shoe to exert a uniform pressure throughout its entire length, thus making the whole shoe effective. The torque stops prevent the brake shoe rotating with the brake drum and front wheel. Since the centre of the ball $b$ is in line with the axis of the pintle 10 on which the front wheels swing for steering the vehicle, the position of the wheel does not in any way interfere with the operation of the brake, and since the lifting movement of the shoe and consequently the arc through which the ball-shaped head $b$ moves about the axis of the rock shaft 30, is very small, the necessary lift being only a small fraction of an inch, no cramping results from the slightly arcuate path of the ball-shaped head. In practice, no equalizers between the right and left brakes on the front wheels are employed, this being found to be unnecessary.

It will be seen that no change in the front axle is required, as all the parts of the front wheel brakes can be readily applied to the ordinary chassis, and that the whole structure, besides being simple and inexpensive in itself, can be readily put in place with a minimum of labor.

In practice, the parts are preferably so designed and adjusted that the pressure exerted by the brake shoe on the drums of the front wheels always produces less braking effect than is produced by the rear wheel brakes, so that it is practically impossible for the front wheel brakes to lock the front wheels. This renders the brakes safe under all conditions.

What I claim is:

1. In combination, a front axle, a stub axle pivoted thereto, a rock shaft on the axle, a ball member on the rock shaft, a front wheel on the stub axle provided with a brake drum, a plate secured to the stub axle, a brake shoe, torque stops on the plate, and a socket member connected to the said brake shoe and ball member, the centre of said ball member being in line with the axis of the pivot connecting the stub axle to the front axle.

2. In combination, a front axle, a pivoted stub axle, a wheel on said stub axle, a plate secured to the stub axle, a rock shaft on the front axle, said rock shaft having an arm with a ball-shaped head extending toward the front wheel, the centre of said head being located in the pivotal axis of the stub axle, a brake shoe supported on said plate and located above the stub axle, a socket member engaging said ball-shaped head, and thrust members extending from said socket member to the ends of the brake shoe.

3. In combination, a front axle, a stub axle, a pintle pivotally connecting said axles, a wheel on the stub axle having a brake drum, a brake cooperating with the drum, a rock shaft on the front axle, an arm on the rock shaft having a ball-headed member substantially in line with the axis of the pintle, a socket member engaging said ball-headed member and movable with the stub axle about said pintle, and connections between the socket member and the brake.

4. In a front wheel brake, in combination, a steering knuckle, a wheel carried thereby, a brake drum on said wheel, a brake shoe cooperating with said drum, an equalizing member, operating means therefor having a universal connection therewith in the pivotal axis of said steering knuckle, and connections between said equalizing member and said brake shoe on opposite sides of said axis.

In testimony whereof I affix my signature.

STEPHEN I. FEKETE.